(12) United States Patent
Agnitch et al.

(10) Patent No.: US 9,182,028 B2
(45) Date of Patent: Nov. 10, 2015

(54) TORSIONAL IMPACT DAMPING AND DECOUPLING PULLEY

(71) Applicant: MOTORCAR PARTS OF AMERICA, INC., Torrance, CA (US)

(72) Inventors: John G. Agnitch, Rolling Hills Estates, CA (US); Nelson Meza, Lynwood, CA (US)

(73) Assignee: MOTORCAR PARTS OF AMERICA, INC., Torrance, CA (US)

( * ) Notice: Subject to any disclaimer, the term of this patent is extended or adjusted under 35 U.S.C. 154(b) by 66 days.

(21) Appl. No.: 13/763,386

(22) Filed: Feb. 8, 2013

(65) Prior Publication Data

US 2014/0228158 A1    Aug. 14, 2014

(51) Int. Cl.
| | |
|---|---|
| *F16H 55/36* | (2006.01) |
| *F16D 3/12* | (2006.01) |
| *F16D 41/00* | (2006.01) |
| *F16D 3/68* | (2006.01) |

(52) U.S. Cl.
CPC *F16H 55/36* (2013.01); *F16D 3/12* (2013.01); *F16D 3/68* (2013.01); *F16D 41/00* (2013.01)

(58) Field of Classification Search
CPC .. F16H 55/36; F16H 2055/366; F16H 7/1218
USPC ............. 474/94; 464/34, 74, 76, 83; 192/55.6
See application file for complete search history.

(56) References Cited

U.S. PATENT DOCUMENTS

| | | | |
|---|---|---|---|
| 5,788,576 A | 8/1998 | Varin | |
| 6,083,130 A | 7/2000 | Mevissen et al. | |
| 6,394,247 B1 | 5/2002 | Monahan et al. | |
| 6,394,248 B1 | 5/2002 | Monahan et al. | |
| 7,153,227 B2 | 12/2006 | Dell et al. | |
| 7,618,337 B2 | 11/2009 | Jansen et al. | |
| 7,770,706 B2 | 8/2010 | Cali et al. | |
| 7,798,928 B2 | 9/2010 | Serkh | |
| 7,998,008 B2 * | 8/2011 | Kamdem et al. | ................ 474/94 |
| 2007/0209899 A1 | 9/2007 | Liu et al. | |
| 2008/0110716 A1 | 5/2008 | Gelazin et al. | |
| 2009/0176608 A1 | 7/2009 | Jansen et al. | |
| 2010/0101909 A1 | 4/2010 | Dell et al. | |
| 2010/0234156 A1 | 9/2010 | Riu | |
| 2010/0255943 A1 | 10/2010 | Cali et al. | |
| 2012/0295746 A1 * | 11/2012 | Cali et al. | ........................ 474/94 |

FOREIGN PATENT DOCUMENTS

| | | |
|---|---|---|
| EP | 1279807 B1 | 1/2004 |
| WO | WO 2011/060551 A1 | 5/2011 |

* cited by examiner

*Primary Examiner* — Sang Kim
*Assistant Examiner* — Juan Campos, Jr.
(74) *Attorney, Agent, or Firm* — Pillsbury Winthrop Shaw Pittman LLP

(57) ABSTRACT

A pulley assembly for an automobile auxiliary apparatus, such as an alternator, that dampens torsional impacts and reduces the stress on the auxiliary apparatus, the belt drive system and other apparatuses, by use of both wear-prone damping elements and a one-way overrunning clutch mechanism allowing for the free run of the pulley shaft.

10 Claims, 5 Drawing Sheets

TORSIONAL IMPACT DAMPING AND DECOUPLING PULLEY

FIELD OF INVENTION

The invention relates generally to a pulley for an auxiliary apparatus of a vehicle engine which allows for the transfer of rotational energy to the auxiliary apparatus through a drive belt system while both reducing harmful torsional impact events on the auxiliary apparatus, and allowing for the free overrun of the auxiliary apparatus when the vehicle engine makes sudden negative changes in speed.

BACKGROUND OF THE INVENTION

Most auxiliary apparatuses of a motor vehicle engine—such as the alternator, the power steering pump and the air conditioner compressor shaft—are driven by a serpentine belt connected to a pulley on the crankshaft of an engine. The belt, in turn, drives pulleys on the auxiliary apparatuses.

It is well-known that the serpentine drive belt on a multi-cylinder engine seldom transmits constant torque to the various accessories which it drives. As the pistons sequentially fire, there are sudden torsional impact forces transmitted through the belt to the auxiliary apparatuses. A driven apparatus, such as an alternator, may have significant rotational inertia resisting changes to its rotational velocity, which can cause stress on the serpentine belt and other apparatuses in the belt system.

The prior art discloses the use of a one-way overrunning clutch for a driven pulley. The one-way clutch operates such that it only transmits torque in one rotational direction. However, while such a design allows an auxiliary apparatus to spin freely when the engine makes sudden negative changes in speed—such as when a down-shift occurs or when the engine is turned off—the use of a one-way clutch alone does not address the torsional impacts that occur due to the sequential firing of pistons in a multi-cylinder engine, or other reasons.

The prior art also discloses the use of damping elements within the pulley of an alternator, or some other auxiliary apparatus, to reduce the effect of harmful torsional impacts in a belt driven system. However, such prior art does not adequately address the situation described above, where a sudden reduction in the speed of the engine occurs. In such a situation, while the damping elements may absorb some of the torsional impact, the significant rotational inertia of an auxiliary apparatus, such as an alternator, will cause a tremendous amount of stress on the belt and on other engine accessories and apparatuses, potentially reducing the lives of such parts.

SUMMARY OF THE INVENTION

According to an embodiment of the invention, a pulley assembly comprises an inner shaft with an inner rotating element concentrically coupled to, and disposed about, the inner shaft. An embodiment of the invention further comprises a one-way overrunning clutch disposed between the inner shaft and the inner rotating element, the one-way overrunning clutch being configured so as to permit torque to be transferred from the inner rotating element to the inner shaft, and to substantially prevent the transfer of torque from the inner shaft to the inner rotating element. In a further embodiment of the invention, an outer pulley housing is coupled to, and disposed about, the inner rotating element, and one or more damping elements is disposed between the outer pulley housing and the inner rotating element, whereby torsional impacts to the pulley assembly are substantially reduced.

DETAILED DESCRIPTION

The invention relates generally to a decoupling pulley for an alternator which allows for the transfer of rotational energy to the alternator while isolating harmful torsional impact events inherent in belt systems driven by piston-driven engines. Torsional impacts occur in such belt systems due, in part, to the sequential firing of pistons in piston-driven engines. The invention utilizes high-temperature elastomeric damping elements which compress during such torsional impacts, thereby slowing the accelerative effect on the rotor of the alternator and reducing the stress on the serpentine belt and other components in the belt system.

In addition, alternators have significant rotational inertia which may cause significant stress to the belt, and to other auxiliary apparatuses connected to the belt system, when the engine driving the alternator suddenly slows down. Such stress may shorten the lives of both the belt and other auxiliary apparatuses. The invention incorporates dual ball-bearings and a one-way overrunning clutch which allows the alternator rotor to spin freely when the engine makes sudden negative changes in speed, such as when a down-shift occurs or the engine is turned off. The invention thereby reduces stress not only to the driven auxiliary apparatus, but also to the drive belt and other apparatuses connected to the belt drive system as well.

Figure 1:
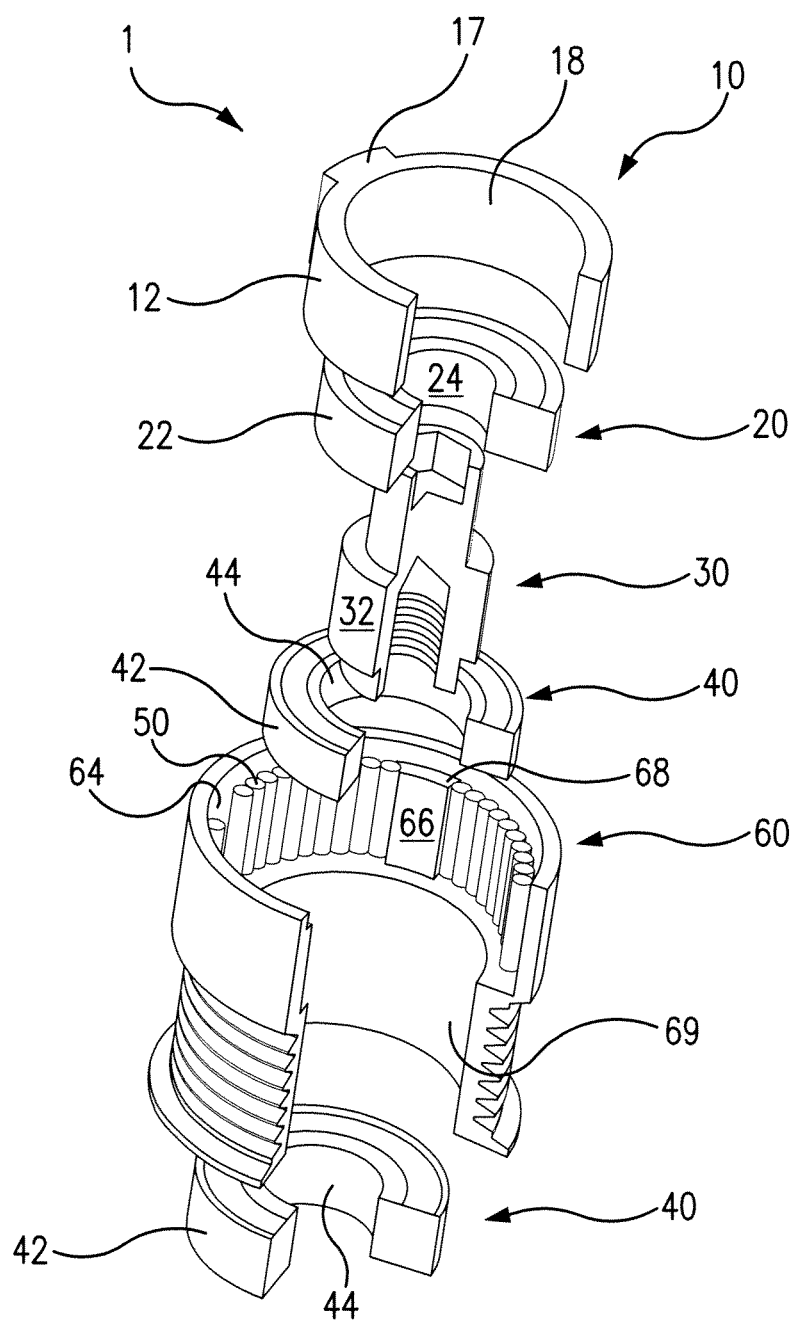
FIG. 1 shows an exploded view of a torsional impact damping and decoupling pulley in accordance with an embodiment of the invention.
Figure 2:
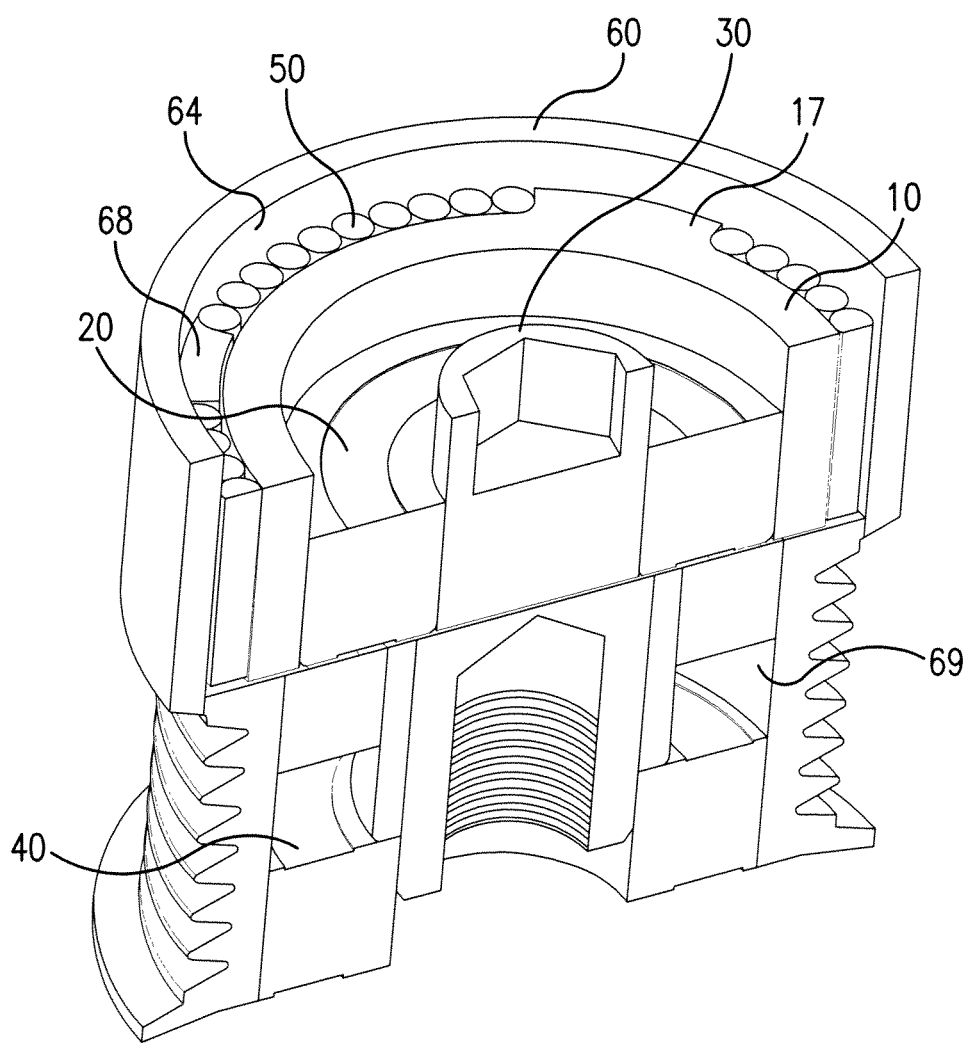
FIG. 2 shows a sectional, isometric view of a torsional impact damping and decoupling pulley in accordance with an embodiment of the invention.

FIGS. 1 and 2 show a pulley assembly 1, including an inner shaft 30, a one-way overrunning clutch 20, an inner rotating element 10, and an outer pulley housing 60. In a preferred embodiment, the one-way overrunning clutch 20 is concentrically configured and selectively rotatable around the longitudinal axis of the inner shaft 30, the one-way overrunning clutch 20 having an inner radial surface 24 configured to mate with, and rotate in one direction with respect to, an outer radial surface 32 of the inner shaft 30.

In a preferred embodiment of the invention, the inner rotating element 10 is concentrically configured and selectively rotatable around the longitudinal axis of the inner shaft 30. In a further embodiment of the invention, the outer radial surface 22 of the one-way overrunning clutch 20 mates with the inner radial surface 18 of the inner rotating element 10. The one-way overrunning clutch 20 may be press fit with the inner radial surface 18 of the inner rotating element 10. The one-way overrunning clutch 20 allows the inner rotating element 10 to drive the inner shaft 30 when the inner rotating element 10 rotates faster than the inner shaft 30, and allows the inner shaft 30 to disengage from, and rotate freely with respect to, the inner rotating element 10 when the inner rotating element 10 rotates slower than the inner shaft 30.

Figure 3:
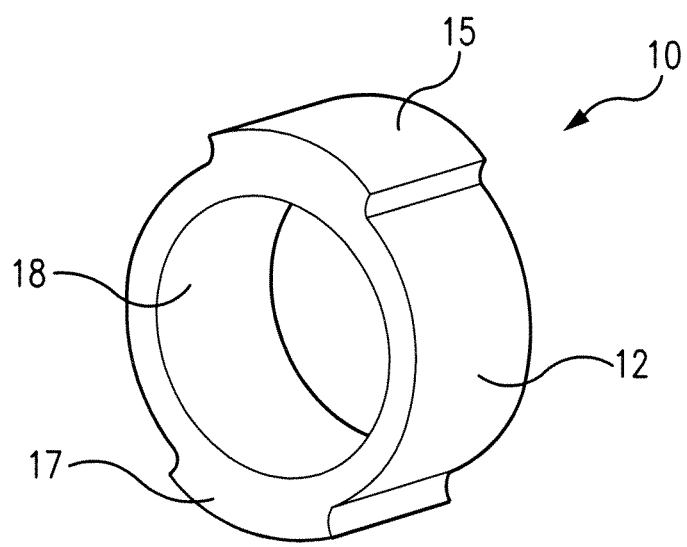
FIG. 3 shows an inner rotating element member in accordance with an embodiment of the invention.

In a preferred embodiment, the inner rotating element 10 includes a first set of opposing outer surface portions 12 having a first radius, and a second set of opposing outer surface portions 15 having a second radius larger than the first radius (see also FIG. 3). The second set of opposing outer surface portions define, respectively, the outer surfaces of ribs 17 projecting radially outward from the inner rotating element. The inner rotating element 10 also includes an inner radial surface 18.

Figure 4:
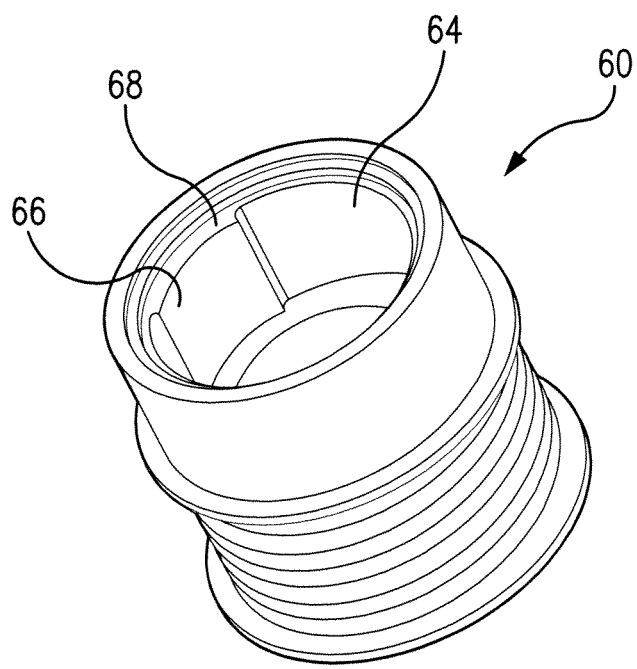
FIG. 4 shows an outer pulley housing member in accordance with an embodiment of the invention.

In another preferred embodiment of the invention, the outer pulley housing 60 is concentrically configured with respect to the inner rotating element 10 so as to permit rotation of the outer pulley housing 60 about the longitudinal axis of the inner rotating element 10. In a preferred embodiment, the outer pulley housing 60 includes a third set of opposing inner surface portions 64 having a third radius, and a fourth set of opposing inner surface portions 66 having a fourth radius smaller than the third radius (see also FIG. 4). The fourth set of opposing inner surface portions 66 define, respectively, the outer surfaces of ribs 68 projecting radially inward from the outer pulley housing.

In a preferred embodiment, the ribs 17 on the inner rotating element 10 rotatably mate with the inner surface portions of the third radius 64 of the outer pulley housing 60 (see FIG. 2). Similarly, the ribs 68 on the outer pulley housing 60 rotatably mate with the outer surface portions of the first radius 12 of the inner rotating element 10. The inner surface portions 64, 66 of the outer pulley housing and the outer surface portions 15, 12 of the inner rotating element may be lubricated so as to facilitate the rotation of the outer surfaces 15, 12 of the inner rotating element 10 along the inner surfaces 64, 66 of the outer pulley housing 60.

It should be appreciated that, although in a preferred embodiment, the ribs 68 on the outer pulley housing 60 are integral with the outer pulley housing, such is not necessarily required by the invention. For example, the inner rotating element 10 may mate with an intermediary member disposed between the inner rotating element 10 and the outer pulley housing 60. The intermediary member may mate with the inner rotating element 10 in a manner similar to the way in which the inner surface of the outer pulley housing 60 mates with the outer surface of the inner rotating element 10, in an embodiment of the invention. Similarly, the intermediary member may mate with the outer pulley housing 60 in a manner similar to the way in which the inner rotating element 10 mates with the outer pulley housing 60.

Figure 5A:
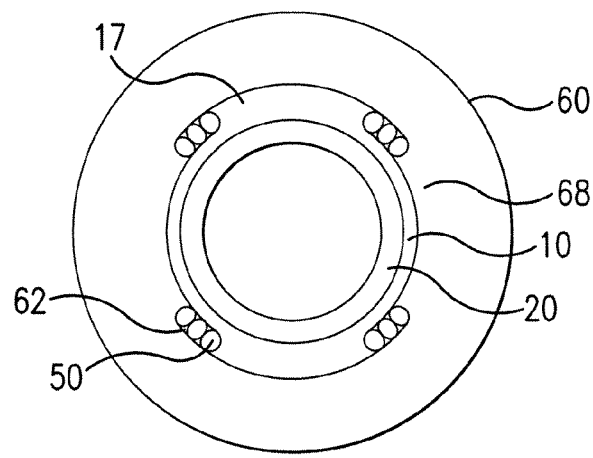
FIG. 5A shows an end view of a torsional impact damping and decoupling pulley assembly in accordance with an embodiment of the invention.
Figure 5B:
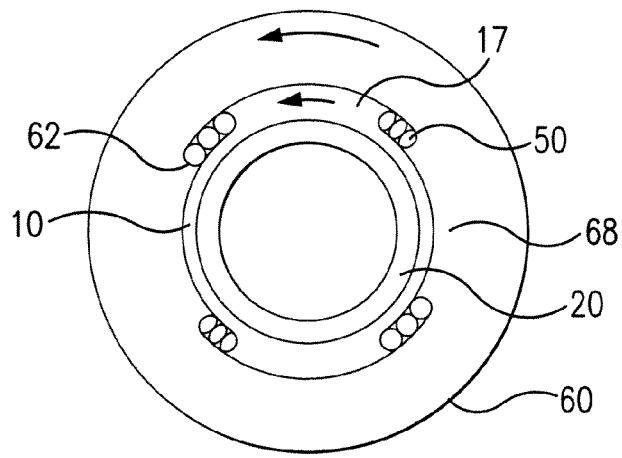
FIG. 5B shows an end view of a torsional impact damping and decoupling pulley assembly during the transfer of a torsional impact to the pulley assembly by the driving force in accordance with an embodiment of the invention.
Figure 5C:
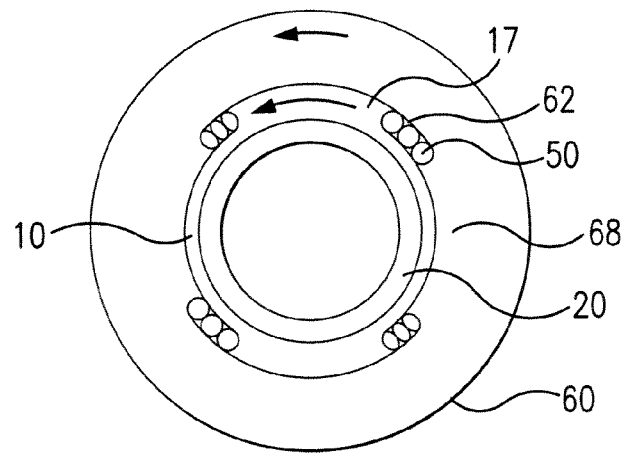
FIG. 5C shows an end view of a torsional impact damping and decoupling pulley assembly during the reduction of speed of the belt driving the pulley assembly in accordance with an embodiment of the invention.

In a preferred embodiment, the mating of the outer surface of the inner rotating element 10 with the inner surface of the outer pulley housing 60 results in a formation of cavities 62 between portions of the outer surface of the inner rotating element 10 and the inner surface of the outer pulley housing 60. In a preferred embodiment, the cavities 62 allow the inner rotating element 10 to rotate approximately twenty-five to thirty-five degrees with respect to the outer pulley housing 60. Further, in a preferred embodiment, one or more damping elements 50 may be placed in such cavities 62, as shown in FIGS. 5A, 5B, and 5C. The damping elements 50 may be formed from elastomeric or similar material, and may be generally cylindrical in shape when not substantially compressed or deformed.

In a preferred embodiment, the damping elements 50 are configured to be compressed during torsional impacts transmitted to the pulley assembly 1 from a driving engine via a drive belt. Such torsional impacts result in the sudden acceleration or deceleration of the outer pulley housing 60 and may be caused by the sequential firing of pistons in piston-driven engines. The damping elements 50 slow the accelerative effect of the torsional impacts on an apparatus driven by the pulley and reduce the stress on the serpentine belt and other components in the belt system. In accordance with embodiments of the invention, additional or fewer damping elements 50 may be used to change the effect any torsional impacts may have on the auxiliary apparatus driven by the pulley, the drive belt, or any other apparatus that is part of the belt drive system. Likewise, damping elements 50 of differing compositions may also be used.

FIGS. 1 and 2 further shows two ball bearings 40, which, in conjunction with the one-way overrunning clutch 20, allow for the inner shaft 30 to rotate freely when the rotational velocity of the outer pulley housing 60 is less than the rotational velocity of the inner shaft 30. In a preferred embodiment, the one-way overrunning clutch 20 and ball bearings 40 are concentrically configured around the longitudinal axis of the inner shaft 30. A first ball bearing 40, having an outer radial surface 42 and inner radial surface 44, may be disposed at a first end of the outer pulley housing 60. The first ball bearing 40 may be configured so its outer radial surface 42 mates with an inner surface portion 69 of the outer pulley housing 60 having a fifth radius smaller than the fourth radius. The first ball bearing may also be configured so its inner radial surface 44 rotatably mates with the inner shaft 30 or an axle of an auxiliary apparatus driven by the pulley assembly 1. A second ball bearing 40 may be disposed at a second end of the outer pulley housing 60 and configured so its outer radial surface 42 mates with an inner radial surface of the outer pulley housing 60 or an inner radial surface of an end cap disposed at the second end of the outer pulley housing 60. The second ball bearing 40 may also be configured so its inner radial surface 44 rotatably mates with the outer radial surface 32 of the inner shaft 30 or the axle of an auxiliary apparatus being driven by the pulley assembly 1. The ball bearings 40 may be needle roller bearings, and may be press fit with the outer pulley housing.

FIGS. 5A, 5B, and 5C show end views of embodiments of the invention and demonstrate a preferred operation of the invention. FIG. 5A shows the pulley assembly 1 when no torque is applied to the outer pulley housing 60 by the drive belt. In this situation, the compression of each of the damping elements is relatively equal.

FIG. 5B shows the compression of certain damping elements 50 when sudden torsional impact forces, such as those caused by firing of pistons in a multi-cylinder engine, are transmitted to the pulley assembly 1 in the drive direction. The drive direction is shown to be counter-clockwise in the embodiment of the invention illustrated in FIG. 5B, as indicated by the arrow on the outer pulley housing in FIG. 5B. Such torsional impact forces may cause the outer pulley housing 60 to rotate faster in the drive direction than the inner rotating element 10 (indicated in FIG. 5B by the longer arrow on the outer pulley housing and shorter arrow on the inner rotating element). According to an embodiment of the invention, such rotation of the outer pulley housing 60 relative to the inner rotating element 10 will cause the compression of damping elements 50 adjacent to, and located in the drive direction of, ribs 68 projecting radially inward from the outer pulley housing 60, thereby resulting in the absorption and reduction of the torsional impact forces transmitted to the outer pulley housing 60. If the damping elements were not present during such sudden torsional impact forces, the torsional impact forces transmitted to the drive belt would be directly transmitted to the apparatus driven by the pulley assembly causing vibration and stress to the apparatus, the drive belt, and other apparatus connected to the serpentine drive belt system.

FIG. 5C shows the compression of certain damping elements 50 when sudden torsional impact forces are transmitted to the pulley assembly 1 in a direction opposite the drive direction. Similar to FIG. 5B, FIG. 5C illustrates an embodiment of the invention where the drive direction is counterclockwise, as indicated by the arrow on the outer pulley housing in FIG. 5C. Such torsional impact forces may cause the outer pulley housing 60 to rotate slower in the drive direction than the inner rotating element 10 (indicated in FIG. 5C by the shorter arrow on the outer pulley housing and longer arrow on the inner rotating element). According to an embodiment of the invention, such rotation of the outer pulley housing 60 relative to the inner rotating element 10 will cause the compression of damping elements 50 adjacent to, and located in the drive direction of, ribs 17 projecting radially outward from the inner rotating element 10, thereby resulting in the absorption and reduction of the torsional impact forces transmitted to the outer pulley housing 60.

FIGS. 5A and 5C show the pulley assembly 1 when the drive belt makes a sudden reduction in speed such that the rotational velocity of the outer pulley housing 60 becomes less than the rotational velocity of the inner shaft 30 of the pulley assembly 1. Such a situation may occur, for example, when an engine which is driving the pulley assembly 1 via a drive belt makes a sudden reduction in speed due to a downshift or the turning off of the engine. When such reduction in speed occurs, the damping elements 50 adjacent to, and located in the drive direction of, ribs 17 projecting radially outward from the inner rotating element 10, initially compress, as shown in FIG. 5C. However, as the rotational velocity of the outer pulley housing 60 continues to rotate at a speed less than the inner rotating element 10, the inner shaft 30 (shown in FIGS. 1 and 2) may disengage from, and rotate freely with respect to, the outer pulley housing 60 and inner rotating element 10. Since during the free run of the inner shaft 10 substantially no torque is applied by the inner rotating element 10 to the inner shaft 30, the pulley assembly 1 may resemble the configuration shown in FIG. 5A, where the damping elements 50 are substantially equally compressed. The free run of the inner shaft 30 is accomplished by the combination of: (a) the one-way overrunning clutch 20 disposed between the inner shaft 20 and inner rotating element 10, such one-way overrunning clutch 20 permitting rotational force to be transferred only from the inner rotating element 10 to the inner shaft 30 but not vice versa; and (b) two ballbearings 40, which may provide support to the inner shaft 30 or axle of the axillary apparatus, and allow the inner shaft 30 or axle of the axillary apparatus to rotate independently from the outer pulley housing 60 and inner rotating element 10. Allowing for the free run of the inner shaft 30 is important because certain auxiliary apparatuses in an automobile, such as an alternator, have significant rotational inertia which will resist changes to their rotational velocity. Such resistance causes stress to and reduces the life of the drive belt and other apparatuses connected to the belt drive system if the apparatus remains engaged to the belt drive system when a sudden negative change in speed occurs by the apparatus driving the belt system, i.e. the engine. By allowing the inner shaft 30 of the pulley assembly 1 to spin freely, the stress to the drive belt and other apparatuses is significantly reduced.

What is claimed is:

1. A pulley assembly comprising:
   (a) an inner shaft;
   (b) an inner rotating element coupled to and disposed concentrically about the inner shaft, the inner rotating element including an outer surface, wherein the outer surface comprises:
      (i) a plurality of outer surface portions having a first radius,
      (ii) a plurality of outer surface portions having a second radius, wherein the second radius is larger than the first radius, wherein each of the plurality of the outer surface portions having the second radius defines an outer surface of a rib projecting radially outward from the inner rotating element;
   (c) a one-way overrunning clutch disposed between and mating with the inner shaft and the inner rotating element, the one-way overrunning clutch being configured so as to permit torque to be transferred from the inner rotating element to the inner shaft, and to substantially prevent the transfer of torque from the inner shaft to the inner rotating element; and
   (d) an outer pulley housing coupled to, and disposed about, the inner rotating element, and one or more damping elements disposed between the outer pulley housing and the inner rotating element, whereby torsional impacts to the pulley assembly are substantially reduced, the outer pulley housing includes an inner surface, wherein the inner surface of the outer pulley housing comprises:
      (i) a plurality of inner surface portions having a third radius;
      (ii) a plurality of inner surface portions having a fourth radius, wherein the fourth radius is smaller than the third radius, wherein each of the plurality of inner surface portions having a fourth radius defines the outer surfaces of a rib projecting radially inward from the outer pulley housing;
   wherein the outer surface portions of the inner rotating element defined by the first radius rotatably mate with the inner surface portions of the outer pulley housing defined by the fourth radius, the outer surface portions of the inner rotating element defined by the second radius rotatably mate with the portions of the inner surface of the outer pulley housing defined by the third radius, and the outer pulley housing is coupled to, and disposed about, the inner rotating element, so as to define a plurality of radial cavities therebetween;
   wherein each of the lu rali of dam sins elements is dis.osed in one or more of the plurality of radial cavities.

2. The pulley assembly of claim 1, wherein each of the plurality of cavities is bounded on a first side by an outer surface portion of the inner rotating element defined by the first radius, on a second side by a rib projecting radially outward from the inner rotating element, on a third side by an inner surface portion of the outer pulley housing defined by the third radius, and on a fourth side by a rib projecting radially inward from the outer pulley housing.

3. The pulley assembly of claim 2, wherein the damping elements compress as the distance between a rib projecting radially inward from the outer pulley housing and an adjacent rib projecting radially outward from the inner rotating element decreases.

4. The pulley assembly of claim 2, wherein the damping elements expand or remain the same size as the distance between a rib projecting radially inward from the outer pulley housing and an adjacent rib projecting radially outward from the inner rotating element increases.

5. The pulley assembly of claim 2, wherein the damping elements are in constant engagement with at least one of the following: (i) at least one other damping element, (ii) a rib projecting radially outward from the inner rotating element, (iii) a rib projecting radially inward from the outer pulley housing.

6. The pulley assembly of claim 1, wherein:
(a) the inner rotating element comprises two opposing outer surface portions of a first radius and two opposing outer surface portions of a second radius, wherein the second radius is larger than the first radius;
(b) the outer pulley housing comprises two opposing inner surface portions of a third radius and two opposing inner surface portions of a fourth radius, wherein the fourth radius is smaller than the third radius; and
(c) each of the plurality of cavities is bounded on a first side by an outer surface portion of the inner rotating element defined by the first radius, on a second side by a rib projecting radially outward from the inner rotating element, on a third side by an inner surface portion of the outer pulley housing defined by the third radius, and on a fourth side by a rib projecting radially inward from the outer pulley housing.

7. The pulley assembly of claim 1, wherein the plurality of damping elements are made of high-temperature elastomeric materials.

8. The pulley assembly of claim 1, wherein the one-way overrunning clutch utilizes needle roller bearings.

9. The pulley assembly of claim 1, further comprising a plurality of ball bearings allowing the inner shaft to rotate independently from the inner rotating element when the rotational speed of the inner shaft is greater than the rotational speed of the inner rotating element.

10. The pulley assembly of claim 1, wherein each of the plurality of damping elements is disposed in one of the plurality of radial cavities.

* * * * *